May 18, 1926.

H. S. HOLMES

CONTROLLING ELECTRICALLY OPERATED MACHINES

Filed Oct. 22, 1924. 4 Sheets-Sheet 1

Inventor
Henry S. Holmes.
By His Attorney

May 18 1926.
H. S. HOLMES
1,584,939
CONTROLLING ELECTRICALLY OPERATED MACHINES
Filed Oct. 22, 1924   4 Sheets-Sheet 2
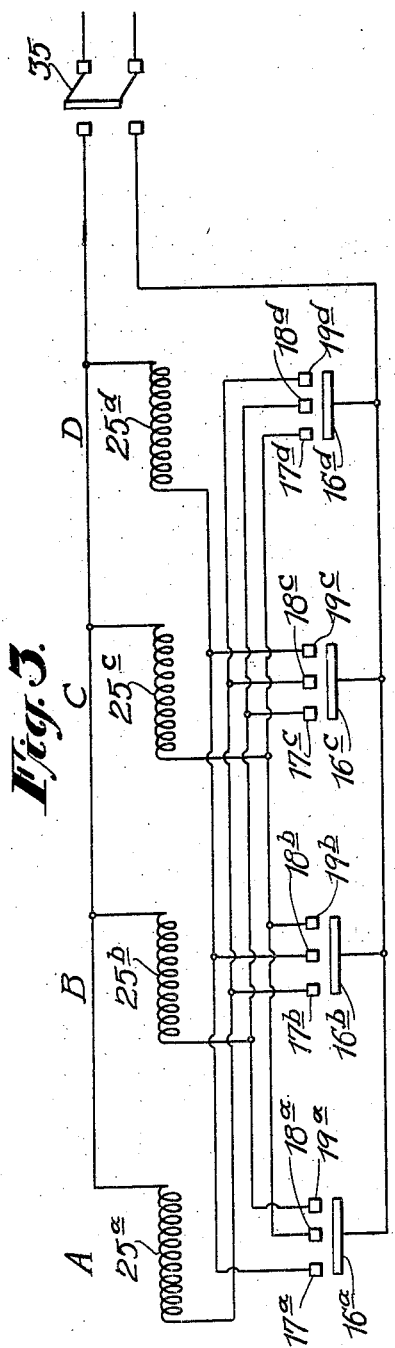
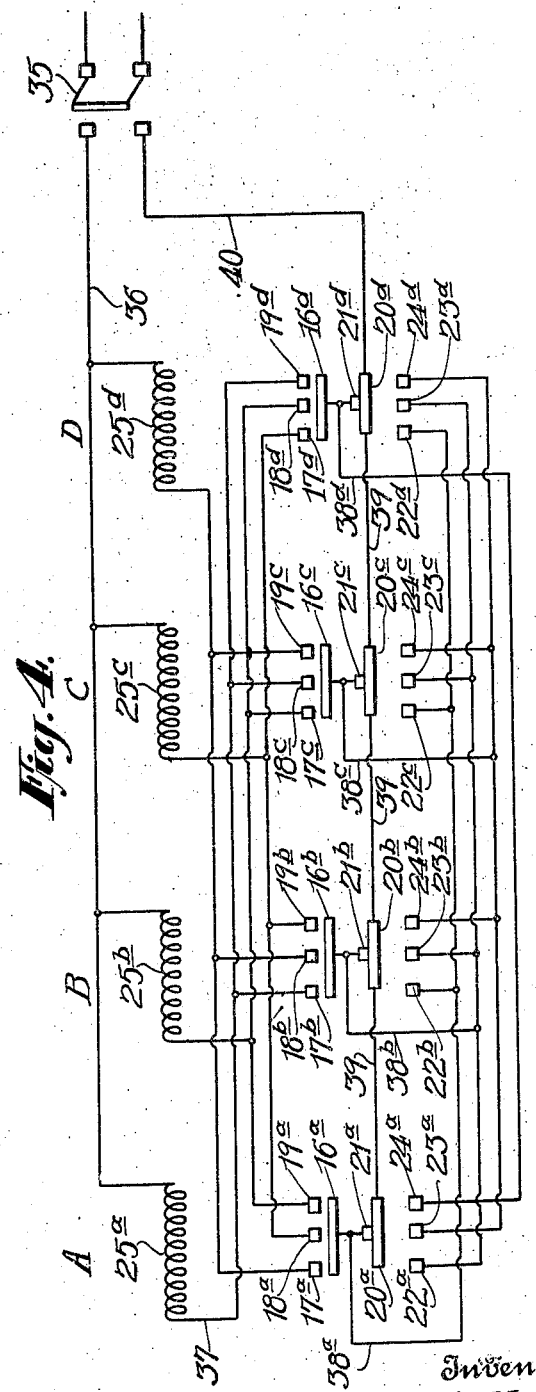
Inventor
Henry S. Holmes
By his Attorney
D. Anthony Usina May 18, 1926.
H. S. HOLMES
1,584,939
CONTROLLING ELECTRICALLY OPERATED MACHINES
Filed Oct. 22, 1924     4 Sheets-Sheet 3
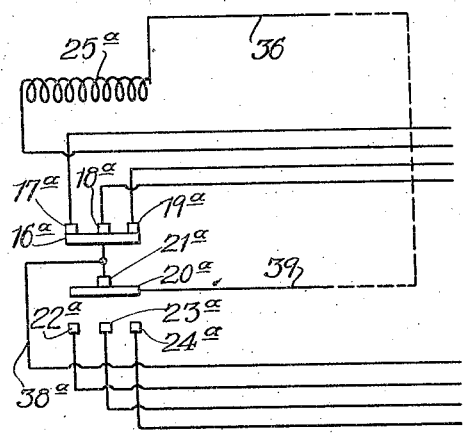
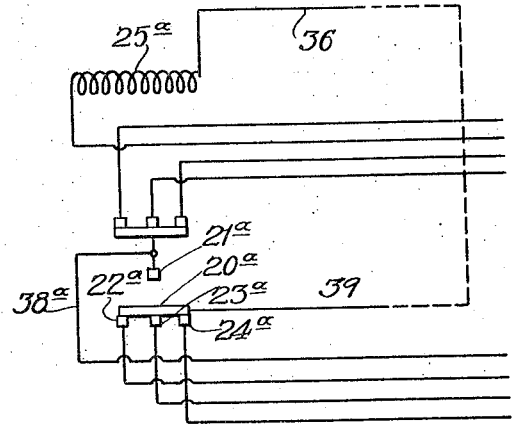
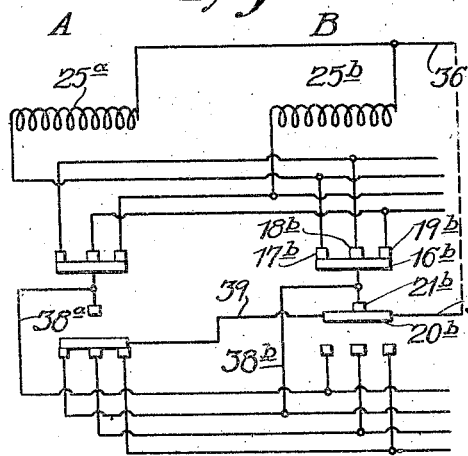
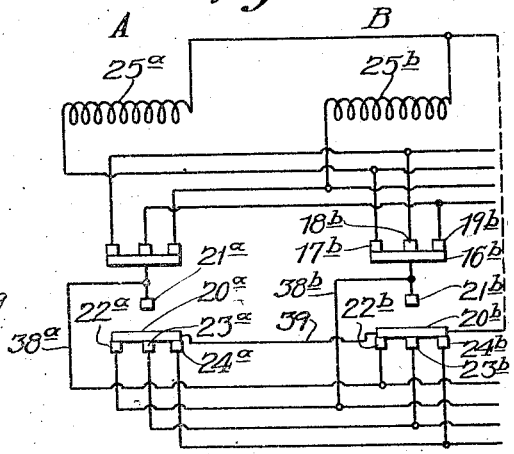
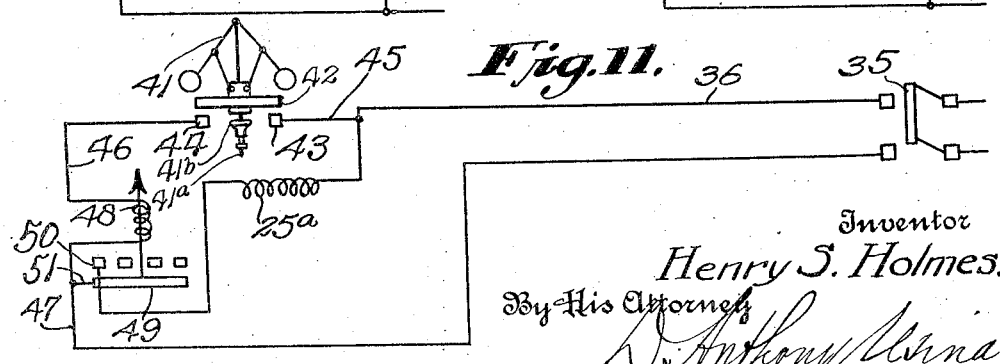
Inventor
Henry S. Holmes.
By His Attorney

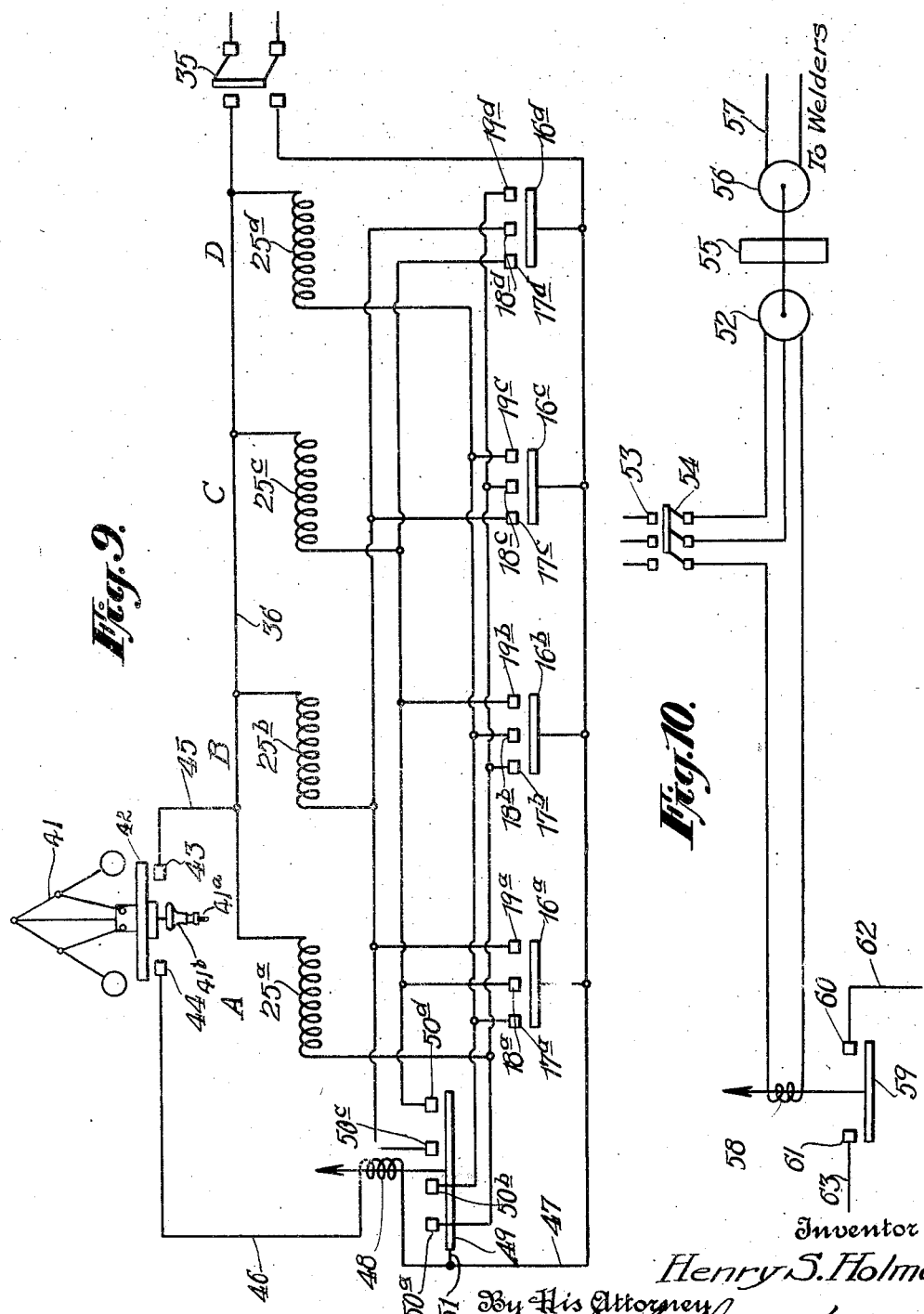

Patented May 18, 1926.

1,584,939

UNITED STATES PATENT OFFICE.

HENRY S. HOLMES, OF NEW YORK, N. Y., ASSIGNOR TO THOMAS E. MURRAY, OF BROOKLYN, NEW YORK.

CONTROLLING ELECTRICALLY-OPERATED MACHINES.

Application filed October 22, 1924. Serial No. 745,265.

In certain classes of electric welding machines and other machines taking large quantities of electric current, the time required for loading and unloading or otherwise preparing the machine for operation is much longer than the time actually consumed in the operation of the machine. These conditions exist noticeably in the Murray process of electric welding, described in the Murray Reissue Patent No. 15,466 of October 10, 1922, in which a current of extremely high amperage is used for a very brief interval of time.

For instance, when welding a certain type of axle housing about five seconds are taken to make the weld and about fifty-five seconds to load the parts into the machine and remove the welded product therefrom. In such a case, if the supply of current is only sufficient for operating one welding machine at a time, it would, nevertheless be possible to utilize such a supply for a number of welders provided they were connected up with the supply, one right after the other. Thus theoretically, for the case given, twelve welds could be made every minute. The actual possibilities would depend chiefly upon the recuperative ability of the electric supply system.

My invention aims to provide a controlling method and apparatus by which a number of such machines can be operated from a system of insufficient capacity to supply them all at the same time. Provision is made to prevent the operators on the different machines from simultaneously taking current for a greater number of machines than the electric system can supply.

The accompanying drawings illustrate embodiments of the invention.

Fig. 3 is a diagram of the controlling system used for an installation of four machines where the supply of current is sufficient for only one at a time;

Fig. 4 is a similar diagram where the supply of current is sufficient to operate two machines at a time;

Figs. 5, 6, 7 and 8 illustrate successive stages in the operation of the installation of Fig. 4;

Fig. 9 is a diagram of the controlling mechanism for four machines, with a supply sufficient for only one at a time, with an additional provision to permit the recuperation of the supply between operations of successive machines;

Fig. 10 is a diagram illustrating an alternative control to permit recuperation of the current.

Fig. 11 is a diagram of a part of the arrangement illustrated in Fig. 9.

Figure 1:
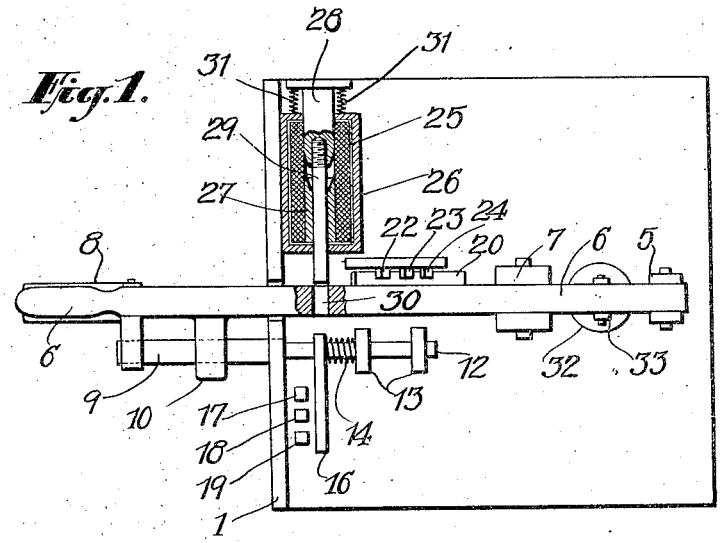
Figs. 1 and 2 illustrate in plan and elevation respectively, a switch used on each of the machines with certain supplementary controlling devices for the switches of the other machines.
Figure 2:
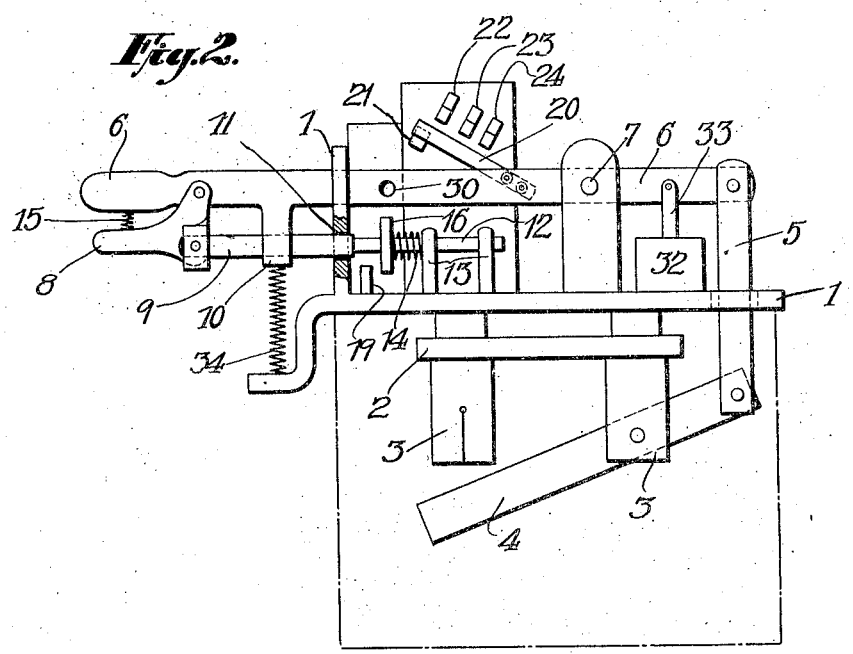

Referring first to Figs. 1 and 2, the iron frame or plate 1 on the top of the casing of the oil switch supports a plate 2 of slate to which are fastened the clips 3 of the switch from one of which the blade 4 is pivoted; the blade being connected by links 5 to the rear end of a switch handle 6 which is pivoted at 7 to an upright on the top of the frame. The end of the switch handle 6 carries a trigger 8 which operates a safety bolt 9 sliding through a bearing 10 on the underside of the handle and adapted to enter a hole 11 in a post fixed on the frame 1. A pin 12 slides in bearings 13 mounted on the frame and is pressed against the end of the safety bolt 9 by a spring 14. The bolt 9 is pressed forward by a spring 15 of greater effective force than the spring 14 so as to hold the safety bolt 9 in place against the pressure on the pin 12.

The spring 14 bears against a strap 16 fixed on the pin 12 and extending laterally past certain contact points 17, 18 and 19 mounted on the frame; these contacts serving to control the circuits of the other welding machines in the manner hereinafter described.

Where two or more machines are intended to be used at the same time, additional controls are provided in connection with the main switch. Figs. 1 and 2 illustrate a second set of controls, but it will be understood that they are unnecessary where a single machine is to be operated at a time. For operating two machines at a time, the switch handle 6 carries a strap 20 adapted to make contact with a point 21 when the main switch 4 is open, and to make contact with the points 22, 23, 24, when the main switch is closed; the contacts 21 to 24 being mounted on an upright post on the top of the switch frame.

A locking device is provided for the handle of the main switch. This is a solenoid 25 mounted in an iron frame 26 on the main frame of the switch. Within the solenoid is a stationary plunger 27 and a movable plunger 28 to which is fastened a rod 29 passing through the stationary plunger and adapted to enter a hole 30 in the switch handle 6 when the handle is down and the solenoid is energized. Springs 31 withdraw the rod 29 and unlock the switch handle when the solenoid is not energized.

A dash-pot 32 may be provided connected to the switch handle 6 by a link 33; the valves in the dash-pot being arranged to permit the oil switch to be closed rapidly but to retard the opening thereof by the spring 34 until after a definite time lag.

Fig. 3 illustrates the control circuits of four welding machines, A, B, C and D, connected to the same source of supply of current, each machine equipped with a switch like that of Figs. 1 and 2, (minus the secondary controls 21 to 24), only one welding machine to be operated at a time. The solenoid 25 of Figs. 1 and 2 is indicated as $25^a$, $25^b$, $25^c$ and $25^d$ for the respective machines, and a similar system of notation is used for the switch contacts. The contacts 16 to 19 for any one machine are so connected as to control and lock open the switches of the other three machines. The hand switch 35 connects with the supply lines for the control circuit.

Assume, for example, that machine A is to be operated. The operator grasps the switch handle 6 and lifts the trigger 8, which withdraws the safety bolt 9, thus releasing the handle to permit the closing of the main switch. At the same time the pin 12 is moved forward by its spring, closing the circuit through the strap 16 and the contacts 17, 18 and 19; or, referring to the machine A of Fig. 3 through the strap $16^a$ and the contacts $17^a$, $18^a$ and $19^a$, thus energizing the solenoids $25^b$, $25^c$ and $25^d$ so as to lock open the oil switches of these three machines.

The lifting of the handle 6 of the main switch starts the welding current in machine A, which flows until it is broken, as, for example, by a circuit breaker, in series with the oil switch such as is shown in Murray & Murray Patent No. 1,320,896. The switch handle is then released and the switch opened by its spring 34, the opening movement being preferably retarded by the dash-pot 32. When the switch is completely opened, the safety bolt 9 will slide back into the hole 11 locking the switch open and at the same time breaking the connection at the strap $16^a$ so as to de-energize the solenoids of the other machines and permit their operation in turn. The supplementary contacts on the switch of the machine B serve similarly to control the solenoids on the machines A, C and D and similarly for the others. If two or more operators try to weld at the same time, all the switch handles 6 will be locked by their solenoids and no one of the switches can be closed.

Referring to Fig. 4, illustrating four machines, A, B, C and D, with a sufficient supply of current to operate two at a time, the supplementary contacts on each switch are so arranged as to de-energize the solenoids until the switches of two machines have been closed, whereupon the solenoids of the other two are energized to lock them. In this case the current passes by the line 36 to the several solenoids and from each solenoid to one of the three contacts 17, 18 and 19 of the other three switches. For example, the line 37 from the solenoid $25^a$ is connected to the contacts $17^b$, $18^c$ and $19^d$. Each of the straps 16 is connected to the corresponding contact 21 and from these connections, lines $38^a$, $38^b$, $38^c$ and $38^d$ make connections with the contacts 22, 23 and 24 of the other three machines. For example, the line $38^a$ connects with the contacts $22^b$, $22^c$ and $22^d$; the line $38^b$ connects with the contacts $23^a$, $23^c$ and $23^d$ and so forth. The several straps 20 are connected to each other by a conductor 39 and are connected by a conductor 40 to the return line of the supply circuit.

When one switch is operated the strap 16 thereof moves against the contacts 17, 18 and 19 to close the circuits of the other three solenoids and lock their switches; but at or about the same time, the withdrawal of the strap 20 from the contact 21 opens the circuits of the other three solenoids and leaves their switches free to operate. When the main switch of a second machine is operated, however, the circuit of the remaining solenoids is closed and kept closed so that their switches are locked.

Figs. 5, 6, 7 and 8 illustrate the successive stages in the starting of two of the welding machines A and B. When the operator on machine A lifts the trigger, the parts move to the position of Fig. 5 completing the circuit through the solenoids of the other machines through the parts $21^a$ and $20^a$ and the conductor 39. The solenoids of machines B, C and D are thus energized and their switches locked. The complete operation of the switch for the machine A is illustrated in Fig. 6. This is the same as Fig. 5 except that the strap $20^a$ has moved away from the contact $21^a$ and thus broken the circuit through the solenoids of the other machines, leaving them free to operate.

Now suppose the operator at machine B takes hold of the switch lever and pulls the trigger. See Fig. 7. This moves the strap 16ᵇ into contact with the points 17ᵇ, 18ᵇ and 19ᵇ and completes the circuit through the other three solenoids; but the solenoid of machine A cannot advance its core to lock the switch, because the switch has already been opened. Thus only the switches of machines C and D are locked. The circuit through these is completed by way of the contacts 21ᵇ and 20ᵇ and the line 39.

In the complete operation of the switch of machine B, however, the strap 20ᵇ is moved away from the contact 21ᵇ, Fig. 8. However, this will not break the circuits through the other solenoids because a path has been made for the current from these solenoids by the closing of the switch of machine A. This path is through the contacts 17ᵇ, 18ᵇ and 19ᵇ to the strap 16ᵇ, thence through the conductor 38ᵇ to contact point 22ᵃ and strap 20ᵃ and through the conductor 39 to the other side of the supply switch 35. Thus the circuit will remain closed until the strap 20ᵃ is removed from the contact points 22ᵃ, 23ᵃ and 24ᵃ, which occurs when the oil switch of machine A is opened. No dash-pot is necessary with this arrangement of the connections.

Supposing the taking of current to continue by machine B after machine A has been restored to its idle position. Either of the machines C and D can be operated because of the breaking of the circuit of their solenoids at the strap 20ᵇ of the second machine. And when one of the machines C, for example, is connected up by the closing of its switch, the other two machines A and D will be locked.

In the arrangement of Fig. 9, we have assumed four welding machines A, B, C and D on a fly-wheel motor generator set in which a motor operates the generator through a fly wheel which is gradually brought up to speed so as to accumulate therein a quantity of stored energy to be drawn on by the generator. In the supposed case, only one welder is to be operated at a time. The equipment of the different switches is the same as for Fig. 3. Besides arranging to lock out all other welders than the one which is to be operated, I have provided an additional lock to prevent the closing of any welding machine switch until the motor-generator set has been brought up to speed.

A governor 41 having a shaft 41ᵃ passing through a fixed bearing 41ᵇ is rotated by the motor generator and raises or lowers a strap 42 which registers with contacts 43 and 44. When the motor generator set is not up to speed, the strap 42 bridges the contacts and closes the circuit through conductors 45, 46 and 47 in which is interposed a solenoid 48. This solenoid lifts a strap 49 into engagement with contacts 50ᵃ, 50ᵇ, 50ᶜ and 50ᵈ in the circuits of the several switch-locking solenoids 25ᵃ, 25ᵇ, 25ᶜ and 25ᵈ. The strap 49 has a connection 51 to the return line 47, so that the lifting of the strap energizes the solenoids on the several machines and locks their oil switches.

When the motor is up to speed the connection at 42 is broken, the solenoid 48 is de-energized, the connection through the strap 49 is broken and the locking solenoids 25ᵃ, 25ᵇ, 25ᶜ, 25ᵈ are de-energized and stand in their initial positions so that the machines may be operated one at a time as in connection with Fig. 3. No dash-pot is necessary with this governor control.

Instead of using a governor operated by the speed of the motor generator, I may control the operation of the machines and prevent their operation before the current supply is sufficient by a device controlled by the current which the motor takes. Such an arrangement is shown in Fig. 10. The motor 52 takes its current from any suitable source of supply 53 through a switch 54. It drives the shaft of a fly wheel 55 which operates a generator 56 which supplies current to the line 57 leading to the welding machines. When the motor is running idle at synchronous speed, it consumes a small current just sufficient to cover the losses in the motor generator set. When the welding machine is connected to the generator 56, the current taken by the motor 52 will increase many fold. In the circuit supplying current to the motor is a solenoid 58 carrying a strap 59 adapted to bridge the contacts 60 and 61 and so adjusted that the no load current of the motor is not sufficient to close the switch. But any increase over this no load current will close the switch at 59.

Conductors 62 and 63 lead from this switch to line 36 and solenoid 48 respectively, as in Fig. 9, so that the closing of the switch 59 will lock open the oil switches of all the welding machines except the one which has already been closed and whose consumption of current has caused the closing of the switch 59.

This condition of increased current in the circuit of the motor 52 will continue until the welding operation has been terminated and the motor generator has had time to get back to idle synchronous speed, so that it is adapted to supply sufficient current for the next welding operation. As soon as the oil switch on the welder which was being used is opened, its controlling solenoid will lock it, the pin 29 having been pressed continuously against the switch handle, and this switch as well as the others will be locked until the motor generator has effected the desired recuperation.

Where the location of the machines permits it, the governor 41 of Fig. 9 might be made to actuate directly the switch 49 without the interposition of the solenoid 48.

But usually the generator will be at such a distance from the machines that it will be simpler and more economical to use a switch 42 closely connected to the governor and to run the single pair of conductors 45 and 46 to the solenoid 48 located near one of the welding machines.

Similarly for Fig. 10, the solenoid 58 may be arranged to operate directly on a switch 49 like that of Fig. 9 or the conductors 62 and 63 may be run to a solenoid operating a contact strap like 49.

It will be understood that the number of contacts 17, 18 and 19 and of the contacts 22, 23 and 24 will be increased or diminished according to the number of machines served, being one less than the total number of such machines.

The controls of Figs. 9 and 10 may be used wherever it is necessary to allow time for the accumulation of energy in the current supply system, as where the source of current is insufficient to operate a single machine to which it is connected or any one of a number of machines to which it is connected continuously. The combination of these controls or governing mechanisms of Figs. 9 and 10 with the interlocking switches is particularly useful where we have a motor generator or similar accumulative supply system connected up to a number of machines requiring more current for brief intervals than can be supplied continuously. When using only one welding machine with one circuit breaker and a motor generator with its governor mechanism, it is apparent that the solenoid lock on the circuit breaker will prevent the closing of this breaker while the generator set is recuperating. It locks a switch located in the circuit between the welding machine and the generator, and prevents the closing of the switch when the conditions are not right; that is, when the generator is not up to speed. Fig. 11 illustrates the use of the governor for a single welding machine, showing the elimination of the various controls in Fig. 9; which are unessential when using only one welding machine, but not harmful.

The two conditions under which my invention is important are (1) when the common source of current is insufficient to operate all the machines simultaneously and (2) when it is insufficient to operate any one of the machines continuously. Under the first condition, means must be provided to prevent more than a certain number of the machines from being operated at one time; and under the second condition, means must be provided to prevent the operation while the current source is accumulating or recuperating. If the common source is insufficient to operate more than one of the machines at one time, and is also insufficient to operate any one of them continuously, then means must be provided for preventing the simultaneous operation and also for permitting the necessary accumulation of energy.

The switch 4 which is directly controlled by the interlocking mechanism may carry the current consumed by the machines, or it may be a lighter switch carrying only sufficient current to operate a larger switch which is directly in the circuit of the machines. Various equivalent devices may be used for operatively connecting or disconnecting the machines, all of which I have included in the general expression "circuit breakers."

The machines served may be identical with one another or they may be of different types or of different capacities. In special cases they may be arranged in groups, with the several machines of each group controlled by a single switch and locking mechanism, each group corresponding to one of the machines A, B, C and D referred to above. The supply system, of course, must have sufficient capacity for all the machines of any group.

The electric machines referred to herein may be any one of a great variety; such, for example, as electric furnaces, stoves, irons, toasters, lights, and so forth. The invention, however, is particularly designed and especially adapted for use with welding machines and motor generator sets such as are described in my pending application for Patent No. 689,878. In this case, the oil switch which closes the welding circuit is provided with an auxiliary contactor which increases the field current of the generator, and consequently the voltage of the generator, during the time of the weld. Thus the generator voltage, even at the end of the weld when the speed of the motor generator set has fallen, may be greater than when the set has fully recuperated. This unusual variation in the supply voltage prohibits the use of the ordinary low voltage release, and makes particularly valuable the methods described herein in which the current supply available determines the connecting up of the machines irrespective of any variation in the supply voltage.

Though I have described with great particularity of detail certain embodiments of my invention, yet it is not to be understood therefrom that the invention is restricted to the particular embodiments disclosed. Various modifications may be made by those skilled in the art without departing from the invention as defined in the following claims.

What I claim is:

1. Controlling mechanism for a plurality of electric machines served from a common source of current insufficient to operate them all at once, comprising a circuit breaker for each machine and means actuated by the closing of one circuit breaker for locking open others.

2. Controlling mechanism for a plurality of electric machines served from a common source of current insufficient to operate more than a certain number of them at once, comprising a circuit breaker for each machine and means actuated by the closing of such certain number of said circuit breakers for locking open the others.

3. Controlling mechanism for a plurality of electric machines served from a common accumulative source of current insufficient to operate any of them continuously, comprising a circuit breaker for each machine, means actuated by the closing of one circuit breaker for locking open others and means for keeping all the breakers locked open until the current supply is sufficient.

4. The combination with a plurality of electric machines and a common source of current insufficient to operate them all at once, of a controlling mechanism comprising a circuit breaker for each machine and means actuated by the closing of one circuit breaker for locking open others.

5. The combination with a plurality of electric machines and a common source of current insufficient to operate them all at once, of a controlling mechanism comprising a circuit breaker for each machine and means actuated by the closing of a certain number of circuit breakers for locking open the others.

6. The combination with a plurality of electric machines and an accumulative source of current insufficient to operate them all at once, of a controlling mechanism comprising a circuit breaker for each machine, means actuated by the closing of one circuit breaker for locking open others and means for preventing the operation of the machines when the current supply is insufficient.

7. The combination of a plurality of electric welding machines with an accumulative source for supplying current thereto, a circuit breaker for each machine, means actuated by the closing of one circuit breaker for locking open others and means for preventing operation of the machines when the current supply is insufficient.

8. The combination with a plurality of electric welding machines, served with current from a common source, of a controlling mechanism therefor comprising a circuit breaker for each machine and means actuated by the closing of one circuit breaker for locking open others.

9. The combination with a plurality of electric welding machines arranged to take a large quantity of current for a brief interval of time from a common source, of controlling mechanism therefor comprising a circuit breaker for each machine and means actuated by the closing of one circuit breaker for locking open others.

10. The combination with an electric machine of a motor generator adapted to accumulate energy between welding operations and means for preventing the operation of the welding machine only when the current supply is insufficient.

11. The combination with an electric welding machine of a motor generator adapted to accumulate energy between welding operations and means for preventing the operation of the welding machine only when the current supply is insufficient.

12. The combination with a plurality of welding machines arranged to take a large quantity of current for a brief interval of time, of a motor generator for supplying current to said machines of insufficient capacity to supply all the machines at once and adapted to accumulate energy between operations of the machines, a controlling mechanism for said machines comprising a circuit breaker for each machine and means actuated by the closing of one circuit breaker for locking open others and a governing device for preventing the operation of said machines when the current supply is insufficient.

13. Controlling mechanism for a plurality of electric machines served from a common source of current insufficient to operate them all at once, comprising means actuated by the closing of the circuit of one machine for locking other machines out of operation.

14. Controlling mechanism for a plurality of electric machines served from a common source of current insufficient to operate them all at once, comprising means actuated by the closing of the circuits of a certain number of such machines for locking the other machines out of operation.

15. Controlling mechanism for a plurality of electric machines served from a common source of current insufficient to operate them all at once, comprising means actuated by the closing of the circuit of one machine for locking other machines out of operation and means for locking all the machines out of operation until the current supply is sufficient.

In witness whereof, I have hereunto signed my name.

HENRY S. HOLMES.